United States Patent
Chang

(10) Patent No.: US 7,401,172 B2
(45) Date of Patent: Jul. 15, 2008

(54) APPARATUS AND METHOD FOR QUICKLY CONNECTING NETWORK REAL-TIME COMMUNICATION SYSTEM

(75) Inventor: Shu-Mei Chang, Chung Ho (TW)

(73) Assignee: Topspeed Technology Corp., Chung Ho, Taipei (TW)

( * ) Notice: Subject to any disclaimer, the term of this patent is extended or adjusted under 35 U.S.C. 154(b) by 440 days.

(21) Appl. No.: 11/028,618

(22) Filed: Jan. 5, 2005

(65) Prior Publication Data

US 2006/0149869 A1    Jul. 6, 2006

(51) Int. Cl.
G06F 13/42    (2006.01)
G06F 13/00    (2006.01)

(52) U.S. Cl. .................. 710/106; 710/301; 710/62; 455/445; 379/142.01

(58) Field of Classification Search ............. 710/62–63, 710/72–74, 300–305; 455/445; 370/338; 379/142; 709/229
See application file for complete search history.

(56) References Cited

U.S. PATENT DOCUMENTS

| | | | | |
|---|---|---|---|---|
| 5,666,495 A * | 9/1997 | Yeh | .................... | 710/303 |
| 5,890,016 A * | 3/1999 | Tso | ..................... | 710/64 |
| 5,909,596 A * | 6/1999 | Mizuta | .................... | 710/63 |
| 6,189,056 B1 * | 2/2001 | Ogura et al. | .................... | 710/62 |
| 6,266,539 B1 * | 7/2001 | Pardo | .................... | 455/556.2 |
| 6,489,932 B1 * | 12/2002 | Chitturi et al. | .................... | 345/30 |
| 6,889,273 B2 * | 5/2005 | Hayashikoshi et al. | .................... | 710/72 |
| 6,975,712 B1 * | 12/2005 | Schnarel et al. | .................... | 379/142.01 |
| 6,979,075 B2 * | 12/2005 | Silverbrook et al. | .................... | 347/54 |
| 7,197,311 B2 * | 3/2007 | Matusz | .................... | 455/445 |
| 2003/0041206 A1 * | 2/2003 | Dickie | .................... | 710/303 |
| 2003/0186746 A1 * | 10/2003 | Chuang | .................... | 463/42 |
| 2004/0029409 A1 * | 2/2004 | Moon et al. | .................... | 439/65 |
| 2005/0120305 A1 * | 6/2005 | Engstrom et al. | .................... | 715/760 |

* cited by examiner

Primary Examiner—Christopher B Shin

(57) ABSTRACT

An apparatus and a method for quickly connecting a real-time communication system. The apparatus includes a communication control device that can be inserted into a signal receiving device. The communication control device includes an initiation button, a hot key and an input unit, so as to input the control commands and data to a computer via an emission unit. The initiation button initiates the real-time communication system software installed in the controlled device to achieve network connection. The hot key can trigger the real-time communication system software entering into a dialing mode. The input unit comprises a plurality of input buttons and an enter key. The signal receiving device includes a retaining groove disposed thereon for inserting therein the communication control device. In this manner, the communication control device is highly accessible and unlikely to be misplaced.

8 Claims, 4 Drawing Sheets

APPARATUS AND METHOD FOR QUICKLY CONNECTING NETWORK REAL-TIME COMMUNICATION SYSTEM

BACKGROUND OF THE INVENTION

The present invention relates generally to an apparatus and a method for quickly connecting a network real-time communication system. More particularly, the present invention relates to an apparatus and a method that can quickly log on to a real-time communication system software on a computer by remote control, and perform dialing procedure, thereby connecting to one or more counter communication end. In this manner, one can conveniently conduct conversation, exchange electronic mails, or short messages with other people.

The development of electronic and network technology has been widely applied to message transmission. One such example is the development of electronic mail (e-mail) system. In addition to the conventional telephone communication system, one can now send and receive e-mail from almost anywhere at anytime, so long as the network connection is available. However, by using an e-mail system, one can perform real-time conversation neither by using audio signals nor by sending and receiving texts. Therefore, there is developed a network phone.

Network phone is developed to perform audio communication via the Internet. The fundamental working principle of the network phone is converting audio signals to digital information, transmitting the digital information to a network computer or a telephone of the receiver via the network, and converting the received digital information back to the original audio at the receiver end. Such a communication model requires only the payment of the broadband or dialup service. No matter how far away the receiver is located, there is no need to pay extra communication fees for long-distance and international phone calls. However, a series of installation procedure should be performed before one can use the network phone. In addition, both the sender and the receiver are required to install some proper hardware and software. For many users, this technical threshold is part of the reasons why the conventional network phone is not as popular as expected. Therefore, other real-time communication systems, such as the MSN® messenger, the Yahoo® messenger, SKYPE® and the Yahoo® BB are developed. Since the above real-time communication systems include powerful functions, such as real-time message transmission, audio chatting room (conference call), file transmission, e-mail transmission and video communication, they have become one of the most popular communication systems. However, the real-time communication systems described above are limited to the operation in front of a computer. One can not activate the connection and perform any operation by remote control or other means. This location restriction is rather inconvenient.

BRIEF SUMMARY OF THE INVENTION

The present invention is to provide a portable communication control device that is separable from a signal receiving device. The communication control device can quickly initiate the real-time communication system software to form communicable connection with the network by following only some simple steps. The user can use the communication control device to call a communication counter end and input data, thereby enhancing the convenience of real-time network communication and conversion.

In order to achieve the above and other objectives, the apparatus and the method for quickly connecting a real-time communication system of the present invention includes a communication control device that can be inserted into a signal receiving device. The communication control device includes an initiation button, a hot key and an input unit, so as to input the control commands and data to a computer via an emission unit. The initiation button initiates the real-time communication system software installed in the controlled device to achieve network connection. The hot key can trigger the real-time communication system software entering into a dialing mode. The input unit comprises a plurality of input buttons and an enter key. The signal receiving device includes a retaining groove disposed thereon for inserting therein the communication control device. In this manner, the communication control device is highly accessible and unlikely to be misplaced.

DETAILED DESCRIPTION OF THE INVENTION

In order to better understanding the features and technical contents of the present invention, the present invention is hereinafter described in detail by incorporating with the accompanying drawings. However, the accompanying drawings are only for the convenience of illustration and description, no limitation is intended thereto.

Figure 1:
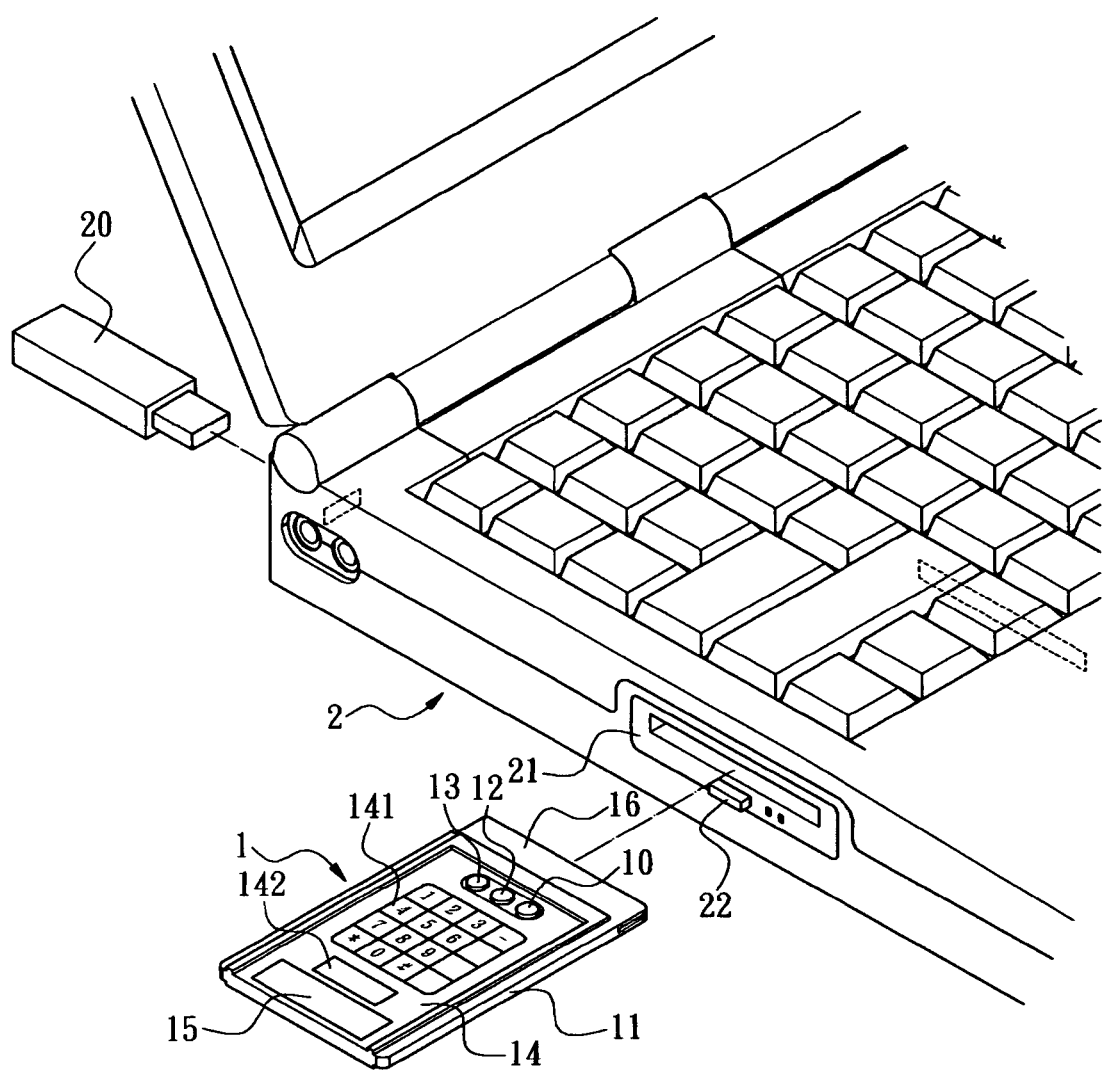
FIG. 1 illustrates an explosive view of the apparatus for quickly connecting a network real-time communication system, in accordance with one embodiment of the present invention.

Referring to FIG. 1, an apparatus for quickly connecting a network real-time communication system in accordance with one preferred embodiment of the present invention is illustrated. The apparatus of the present invention includes a communication control device 1, which has a signal control and input device for transmitting signals in one direction. As shown in FIG. 1, the communication control device 1 is a portable device that can be used in front of a computer or at other locations. The communication control device 1 is capable of activating the real-time communication system, thereby forming a communicable connection. The communication control device 1 can further employ a connection port, e.g. a universal serial bus port, coupled to a signal receiving unit 20, e.g. wireless access point or signal receiver, of a connection port of a signal receiving device 2, e.g. computers and servers, to receive the control commands transmitted from the communication control device 1, and to execute the commands on the signal receiving device 2, so as to complete the initiation of the real-time communication system and perform all of the included functions.

The communication control device 1, as shown in FIG. 1, is a hand-held control device, including a main body 11 that is easily carried and held. On the surface of the main body 11, an initiation button 10 and a hot key 12 are disposed for initiating a real-time communication system software, for connecting to a network and for initiating the system software entering into the dialing mode. A symbol shortcut button 10 is also disposed on the surface of the main body 11 for quickly enter the "@" symbol so as to input an e-mail address. An input unit 14 is further disposed on the main body 11, which includes a plurality of input buttons 141 and an ENTER button 142. In one particular embodiment of the present invention, the input buttons 141 are composed of numerical buttons, which can be used to input numbers and texts by incorporating with an input method. The control commands and the input contents from the buttons 10, 12, 13 and the input unit 14 are transmitted to the signal receiving device 2 through a emission unit (now shown) via infrared or radio frequency wireless remote control signals.

In one particular embodiment of the present invention, the initiation button 10, the hot key 12, and the symbol shortcut button 13 are configured to be a single button. That is, the control button is set to perform the function of initiation button 10 during the initiation process for remotely actuating the real-time communication system software in the signal receiving device. After the real-time communication system software has been properly initiated, the control button is automatically converted to perform the function of the hot key 12. One can employ the hot key 12 for initiating the system software entering into the dialing mode. After entering into the dialing mode, the control button is automatically converted into the "@" symbol shortcut button. Therefore, the same quick operation and input function are achieved.

In other particular embodiments, the initiation button 10 and the hot key 12 are configured into a single control button. Alternatively, the initiation button 10 and the symbol shortcut button 10 can be configured into a single control button. Similarly, the hot key 12 and the symbol shortcut button 13 can be configured into a single control button.

The real-time communication system software that can be quickly initiated via the initiation button 10 and the hot key 12 is one selected from the MSN messenger, Yahoo messenger, SKYPE, and Yahoo BB. One of the real-time communication system software is configured to enter into the dialing mode by using the initiation button 10 and the hot key 12. However, it is appreciated that the initiation button 10 and the hot key 12 can initiate more than one of the above real-time communication system software. Furthermore, the initiation button 10 can be configured to initiate the real-time communication system software that is the most often initiated during a predetermined time period. Moreover, the main body 11 of the communication control device 1 can include a plurality of control groups, each including an initiation button 10 and a hot key 12 to initiate a designated real-time communication system software.

The communication control device 1 described above employs the initiation button 10 and the hot key 12 to initiate the real-time communication system software and enter into the dialing mode. One can employ the input buttons 141 of the input unit 14 and the ENTER button 142 to enter into the dialing operation. In order to ensure the correctness of each dialing information, the input dialing information needs to go through a confirmation procedure, thereby preventing dialing errors.

Figure 2:
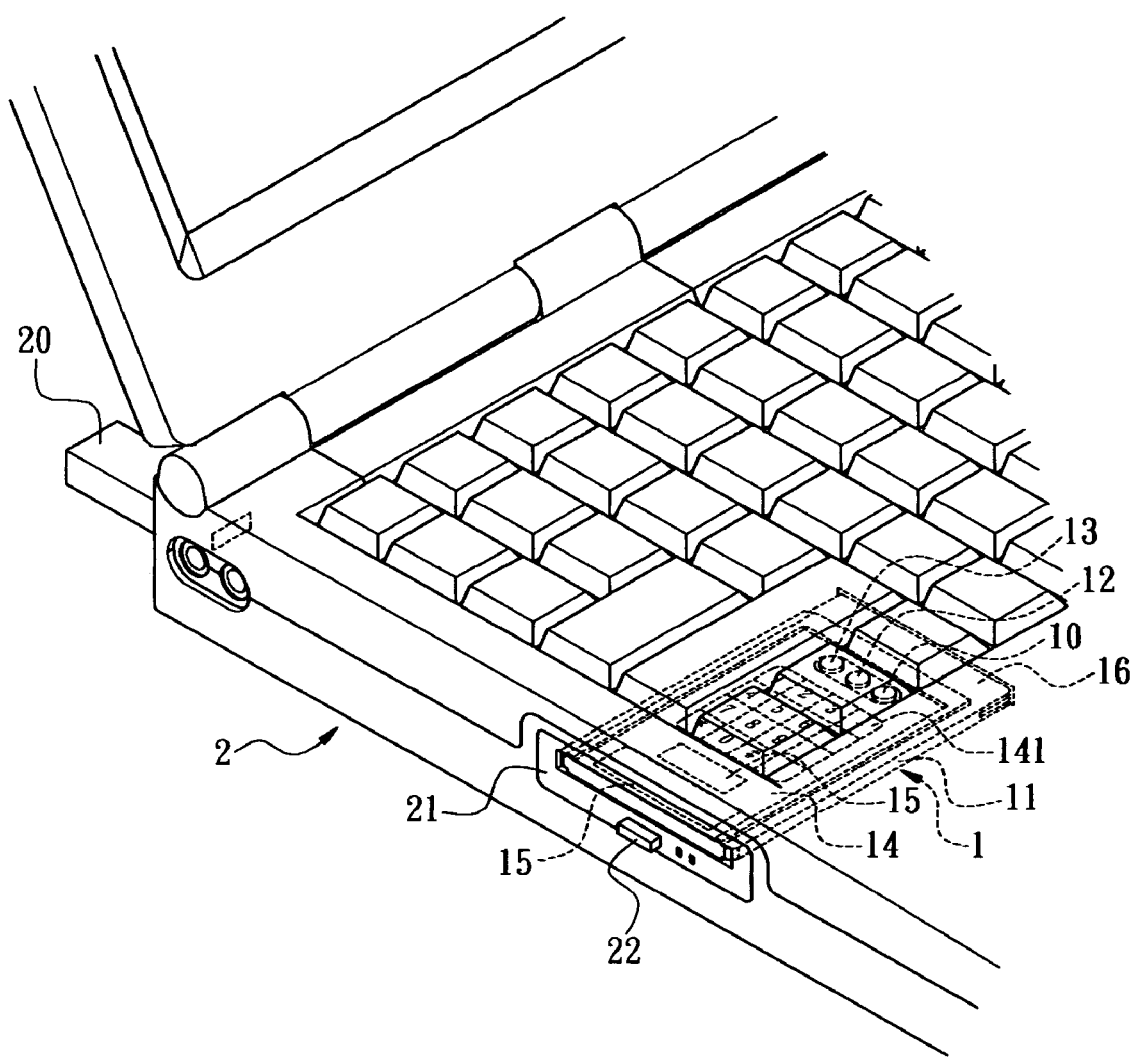
FIG. 2 illustrates a perspective view of the apparatus for quickly connecting a network real-time communication system, in accordance with one embodiment of the present invention.
Figure 3:
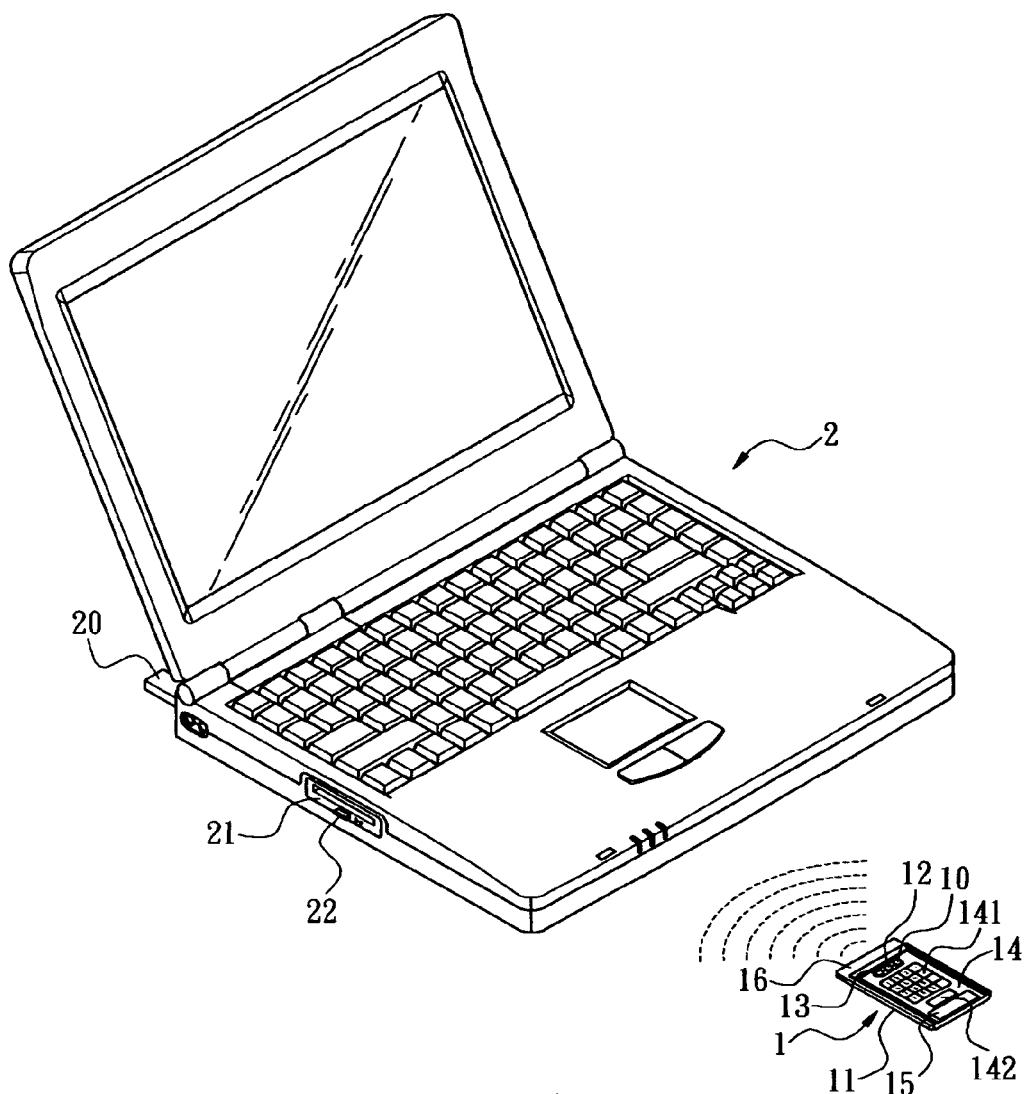
FIG. 3 illustrates the operation of the apparatus for quickly connecting a network real-time communication system, in accordance with one embodiment of the present invention.

The confirmation procedure described above can be realized by further disposing a display unit 15 on a surface of the main body 11 of the communication control device 1, as shown in FIG. 1 and FIG. 2. The display unit 15 displays the information entered through the input unit 14 for users to verify the correctness. If the input content is verified as error free, then transmit the input content by operating the ENTER button 142.

As shown in FIG. 1, the communication control device 1 in accordance with one particular embodiment of the present invention is a card body that can be inserted into the signal receiving device 2. As shown in FIG. 2, the communication control device 1 is inserted into a retaining groove 21 of the signal receiving device 2. In this manner, the communication control device 1 is easy to carry, hold and store. Furthermore, a connection portion 16 is formed on one end of the main body 11, which is connected to the connection port disposed in the retaining groove 21. In addition, A power source pin is formed on the connection portion 16 for charging the communication control device 1 through the power terminal of the connection port.

In one embodiment of the present invention, the signal receiving device 2 is a portable computer, as shown in FIG. 1. The signal receiving device 2 includes at least a retaining groove 21. The retaining groove 21 can be an extension port of the computer, such as a PCMCIA port and a card reader port. The retaining groove 21 includes a connection port for connecting with the communication control device 1. Further, a push rod 22 is formed below the retaining groove 21 for ejecting the communication control device 1 inserted in the retaining groove 21.

The communication control device 1 can be integrated to a remote control device that is used for presentation. On the other hand, the main body 11 can include some function buttons that can remotely control presentation software.

Figure 4:
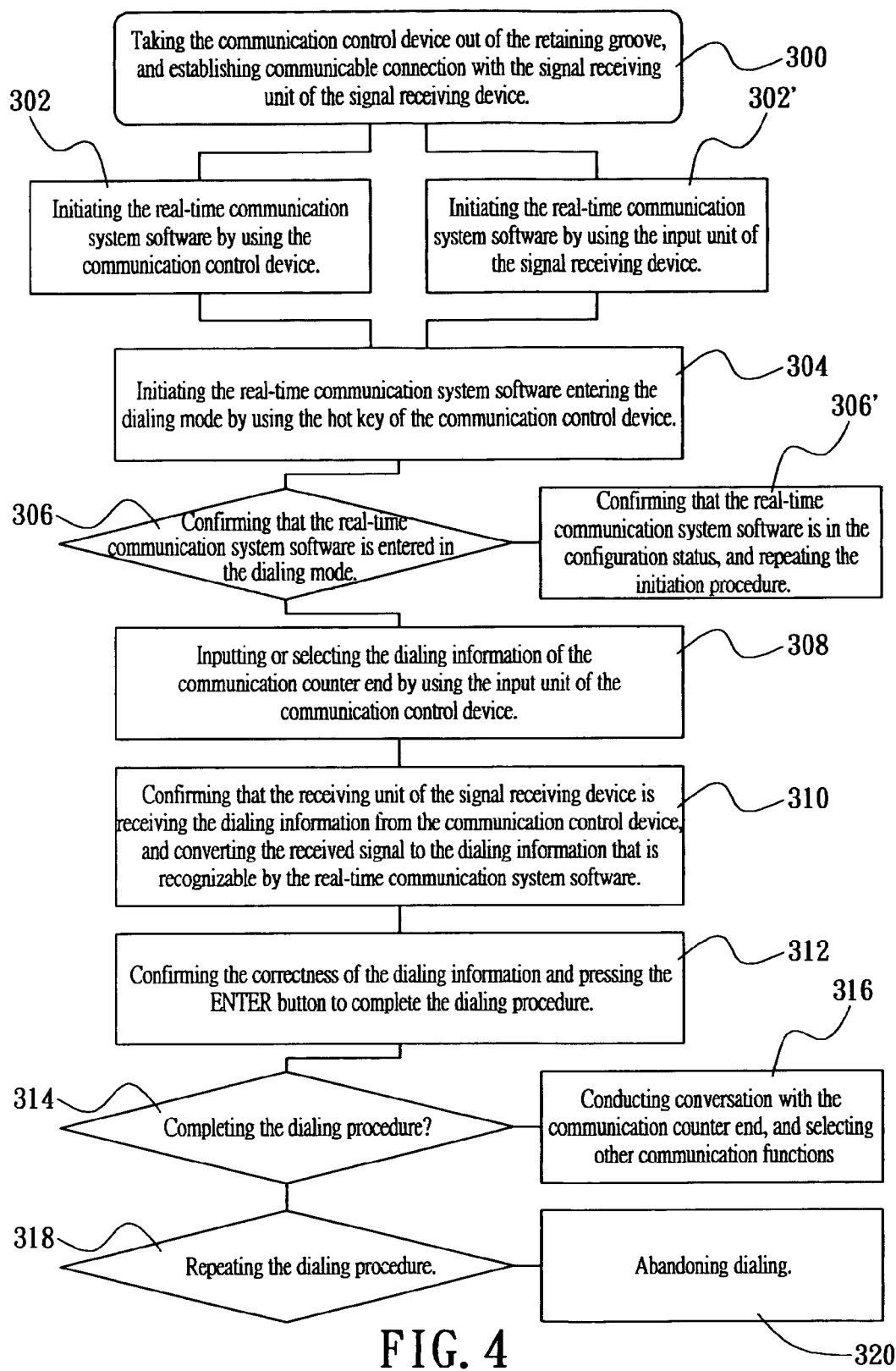
FIG. 4 is a flow diagram illustrating the method for quickly connecting a network real-time communication system, in accordance with one embodiment of the present invention.

According to the apparatus for quickly connecting a network real-time communication system described above, a method for quickly connecting a network real-time communication system is hereinafter disclosed and described. As shown in FIG. 4, the method for quickly connecting a network real-time communication system includes the following steps.

The communication control device 1 is taken out from the retaining groove 21 of the signal receiving device 2, and is manipulated by the user. The communication control device 1 establishes a one-way control signal transmission connection with the signal receiving device 2, i.e. the computer, via a connection port, e.g. a universal serial bus (USB) port, as shown in step 300.

By pressing the initiation button 10 of the communication control device 1, a signal to initiate the real-time communication system software is generated. The initiation signal is transmitted through the emission unit 10 to initiate the designated real-time communication system software of the signal receiving device 2, as shown in step 302. The real-time communication system software can also be initiated directly from the input unit of the signal receiving device 2, as shown in step 302'.

By using the hot key 12 of the communication control device 1, the real-time communication system software enters the dialing mode, as shown in step 304. The real-time communication system software entering into the dialing mode is confirmed in step 306. If the real-time communication system software did not enter into the dialing mode, then repeat or abandon the initiation procedure, as shown in step 306'.

By using the input unit 14 of the communication control device 1, one can input or select the stored dialing information of the receiving end. If the communication control device 1 does not have a display unit 15, the confirmation of input data is performed through the monitor of the signal receiving device 2. If the communication control device 1 includes a display unit 15, the confirmation procedure is then performed through the display unit 15.

The signal receiving device 2 confirms that the signals received are from signal receiving unit 20 of the counter communication control device 1. The signal receiving unit 20 then receives the dialing information from the communication control device 1. The dialing information is then converted to the dialing information recognizable to the real-time communication system software, as shown in step 310.

After confirming the correctness of the dialing information described above, the ENTER button 142 is pressed to complete the dialing procedure, as shown in step 312.

After executing the dialing procedure by the real-time communication system software and completing the connection with the communication counter end (as shown in step 314), one can then conduct conversation with anyone at the communication counter end by using an audio transmission unit, e.g. ear phone and microphone (not shown). During the conversation, one can further select and perform other functions.

If the connection fails with the communication counter end when executing the dialing procedure through the real-time communication system software, one should then restart the dialing procedure, as shown in step 318, or give up dialing, as shown in step 320.

Since, any person having ordinary skill in the art may readily find various equivalent alterations or modifications in light of the features as disclosed above, it is appreciated that the scope of the present invention is defined in the following claims. Therefore, all such equivalent alterations or modifications without departing from the subject matter as set forth in the following claims is considered within the spirit and scope of the present invention.

What is claimed is:

1. An apparatus for quickly connecting a real-time communication system, the apparatus comprising:
    a communication control device to be received in a PCMCIA socket or a card reader socket of a computer device when the communication control device is not in use;
    an individual signal receiving unit to be connected to a universal serial bus (USB) port of the computer device, for receiving wireless signals from the communication control device after taking the communication control device out of the computer device for operation;
    an initiation button disposed on the communication control device for quickly and remotely initiating a real-time communication system software in the computer device via the signal receiving unit to connect a network through the computer device;
    a hot key disposed on the communication control device for quickly and remotely activating the real-time communication system software via the signal receiving unit to enter into a dialing mode; and
    an input unit disposed on the communication control device for inputting via the signal receiving unit.

2. The apparatus as recited in claim 1, wherein the communication control device comprises a symbol shortcut button, which inputs a special symbol of @; the symbol shortcut button can further be combined with the hot key to become a single control button, and can be switched therebetween by incorporating with a software; or the symbol shortcut button can further be combined with a control button and the hot key to become a single control button, and can be switched therebetween by incorporating with a software.

3. The apparatus as recited in claim 1, wherein the communication control device further comprises a display unit for confirming the correctness of the input data.

4. The apparatus as recited in claim 1, wherein the communication control device further comprises a connection portion for connecting with a connection port in the PCMCIA socket or the card reader socket, wherein one pin of the connection portion is configured as a power terminal for charging the communication control device through the computer device.

5. The apparatus as recited in claim 1, wherein the input unit of the communication control device further comprises a plurality of input buttons and an ENTER button.

6. A method for quickly connecting a real-time communication system comprising a communication control device that can be received in a PCMCIA socket or a card reader socket of a computer device when the communication control device is not in use, the communication control device comprising at least a control button for operating a real-time communication system software in the computer device and an input unit for inputting control commands and data, the method comprising the steps of:
    connecting an individual signal receiving unit connected to a universal serial bus (USB) port of the computer device;
    taking the communication control system out of the computer device, and communicably connecting with the signal receiving unit;
    initiating the real-time communication system software via the signal receiving unit and forming a communicable connection with a network through the computer device by using an initiation button disposed on the communication control device;
    initiating the real-time communication system software via the signal receiving unit to enter into a dialing mode by using a hot key disposed on the communication control device;
    inputting dialing information via the input unit of the communication control device, and initiating a dialing procedure after a correctness of the dialing information is confirmed;
    performing real-time communication function if the dialing procedure is successfully completed; and
    repeating or abandoning the dialing procedure if the dialing procedure is not successfully completed.

7. The method as recited in claim 6, wherein the method further comprises the step of confirming the correctness of dialing information entered through the input unit of the communication control device using a monitor of the computer device, or a display unit disposed on the communication control device.

8. A method for quickly connecting a real-time communication system comprising a communication control device that can be received in a PCMCIA socket or a card reader socket of a computer device when the communication control device is not in use, the communication control device comprising at least a control button for operating a real-time communication system software in the computer device and an input unit for inputting control commands and data, the method comprising the steps of:
    connecting a signal receiving unit connected to a universal serial bus (USB) port of the computer device;
    taking the communication control device out of the computer device, and communicably connecting with the signal receiving unit;
    initiating a real-time communication system software in the computer device via the signal receiving unit and forming a communicable connection with a network by using the control button of the communication control device;

initiating the real-time communication system software via the signal receiving unit to enter into a dialing mode by using a hot key disposed on the communication control device;

inputting dialing information via the input unit of the communication control device, and initiating a dialing procedure after a correctness of the dialing information is confirmed;

performing real-time communication function if the dialing procedure is successfully completed;

repeating or abandoning the dialing procedure if the dialing procedure is not successfully completed; and transmitting messages by using the input unit and a symbol shortcut button when the real-time communication function is in operation.

* * * * *

UNITED STATES PATENT AND TRADEMARK OFFICE
CERTIFICATE OF CORRECTION

PATENT NO. : 7,401,172 B2 Page 1 of 1
APPLICATION NO. : 11/028618
DATED : July 15, 2008
INVENTOR(S) : Shu-Mei Chang It is certified that error appears in the above-identified patent and that said Letters Patent is hereby corrected as shown below:

On the title page, item [73]:

Assignee: Topspeed Technology Corp., Chung Ho, Taipei (TW)

should be

Assignee: Topseed Technology Corp., Chung Ho, Taipei (TW)

"Topspeed" was wrong and --Topseed-- is correct.

Signed and Sealed this

Twenty-third Day of December, 2008

JON W. DUDAS
*Director of the United States Patent and Trademark Office*